(12) United States Patent
Folgner et al.

(10) Patent No.: US 10,440,402 B2
(45) Date of Patent: Oct. 8, 2019

(54) METHOD AND SYSTEM FOR GENERATING HIGHLIGHTS FROM SCORED DATA STREAMS

(75) Inventors: Michael George Folgner, Burlingame, CA (US); Ryan Brice Cunningham, San Francisco, CA (US); Stephen Benjamin Weibel, San Francisco, CA (US); Lamthuy Tran Nguyen, San Francisco, CA (US); William Henry Darrow, San Francisco, CA (US)

(73) Assignee: AFTERLIVE.TV INC, San Francisco, CA (US)

( * ) Notice: Subject to any disclaimer, the term of this patent is extended or adjusted under 35 U.S.C. 154(b) by 0 days.

(21) Appl. No.: 13/359,403

(22) Filed: Jan. 26, 2012

(65) Prior Publication Data
US 2012/0189273 A1    Jul. 26, 2012

Related U.S. Application Data

(60) Provisional application No. 61/436,292, filed on Jan. 26, 2011.

(51) Int. Cl.
*H04N 9/82* (2006.01)
*H04N 21/25* (2011.01)
(Continued)

(52) U.S. Cl.
CPC ....... *H04N 21/2187* (2013.01); *H04N 9/8227* (2013.01); *H04N 21/233* (2013.01);
(Continued)

(58) Field of Classification Search
CPC ........ H04N 7/173; H04N 60/29; H04N 60/33; H04N 21/2187; H04N 21/252;
(Continued)

(56) References Cited

U.S. PATENT DOCUMENTS 5,751,844 A * 5/1998 Bolin .................. G06T 5/40
348/221.1
6,317,722 B1  11/2001 Jacobi et al.
(Continued)

FOREIGN PATENT DOCUMENTS

JP    2005-223534 A    8/2005
JP    2006-157691 A    6/2006

OTHER PUBLICATIONS

International Search Report and Written Opinion received for PCT Patent Application No. PCT/US2010/042362, dated Sep. 7, 2010, 9 pages.
(Continued)

*Primary Examiner* — Thai Q Tran
*Assistant Examiner* — Syed Y Hasan
(74) *Attorney, Agent, or Firm* — Brake Hughes Bellermann LLP

(57) ABSTRACT

A method and system for generating highlights from scored data streams is disclosed. According to one embodiment, media content containing time-stamped payloads is received in a data stream from one or more sources. The received media content is recorded in a buffer for a predetermined period of time and sliced into data buckets. For each of the data buckets, a score is assigned according to user-provided keywords. The data buckets are recorded along with the assigned score to generate highlights from the one or more sources using the scores of the recorded data buckets.

2 Claims, 5 Drawing Sheets

(51) Int. Cl.
*H04N 21/2187* (2011.01)
*H04N 21/475* (2011.01)
*H04N 21/472* (2011.01)
*H04N 21/845* (2011.01)
*H04N 21/8549* (2011.01)
*H04N 21/233* (2011.01)
*G06K 9/46* (2006.01)
*G06K 9/00* (2006.01)
*A63F 13/46* (2014.01)

(52) U.S. Cl.
CPC ......... *H04N 21/252* (2013.01); *H04N 21/475* (2013.01); *H04N 21/8456* (2013.01); *H04N 21/8549* (2013.01); *A63F 13/46* (2014.09); *G06K 9/00765* (2013.01); *G06K 9/4647* (2013.01); *H04N 21/47217* (2013.01)

(58) Field of Classification Search
CPC ............. H04N 21/475; H04N 21/8456; H04N 21/8549; H04N 5/235; G06F 19/00; G06F 17/3025; G06F 17/5018; G06F 17/5036; G06K 9/4647; G06T 5/40
USPC .............. 386/241, E5.001, E9.011; 704/251, 704/E15.008; 707/723, 749, 769, 707/E17.014, 791; 700/91, 92; 725/9, 725/12, 23, 24, 32, 38, 91; 719/310; 715/723; 382/156, 165, 170, 274; 348/222.1; 703/2
See application file for complete search history.

(56) References Cited

U.S. PATENT DOCUMENTS

| | | | |
|---|---|---|---|
| 7,519,658 B1 | 4/2009 | Anglin et al. | |
| 7,853,622 B1 | 12/2010 | Baluja et al. | |
| 7,933,338 B1 | 4/2011 | Choudhry et al. | |
| 8,151,194 B1 | 4/2012 | Chan et al. | |
| 8,516,374 B2 | 8/2013 | Fleischman et al. | |
| 8,543,454 B2 | 9/2013 | Fleischman et al. | |
| 8,621,503 B2* | 12/2013 | Marin | H04H 60/33 700/91 |
| 8,925,001 B2* | 12/2014 | Morris | H04N 7/17336 725/32 |
| 2001/0056506 A1* | 12/2001 | Munetsugu | G06F 16/40 719/310 |
| 2003/0055759 A1 | 3/2003 | Conkwright et al. | |
| 2003/0115188 A1 | 6/2003 | Srinivasa et al. | |
| 2004/0034561 A1 | 2/2004 | Smith | |
| 2004/0064316 A1* | 4/2004 | Gallino | G10L 15/063 704/251 |
| 2005/0154637 A1 | 7/2005 | Nair et al. | |
| 2006/0042483 A1 | 3/2006 | Work et al. | |
| 2007/0130580 A1 | 6/2007 | Covell et al. | |
| 2007/0260596 A1 | 11/2007 | Koran et al. | |
| 2008/0059348 A1 | 3/2008 | Glassman et al. | |
| 2008/0071796 A1 | 3/2008 | Ghuneim et al. | |
| 2008/0133638 A1 | 6/2008 | Fischer et al. | |
| 2008/0270541 A1 | 10/2008 | Keener et al. | |
| 2009/0083396 A1 | 3/2009 | Roos | |
| 2009/0132924 A1* | 5/2009 | Vasa | G11B 27/105 715/723 |
| 2009/0327437 A1 | 12/2009 | Estrada | |
| 2010/0037277 A1 | 2/2010 | Flynn-Ripley et al. | |
| 2010/0046924 A1* | 2/2010 | Ikeda | G11B 20/00159 386/241 |
| 2010/0088373 A1* | 4/2010 | Pinkham | G06Q 30/02 709/204 |
| 2010/0121843 A1 | 5/2010 | Goeldi | |
| 2010/0205057 A1 | 8/2010 | Hook et al. | |
| 2010/0211458 A1 | 8/2010 | Ramer et al. | |
| 2010/0251279 A1 | 9/2010 | Piard et al. | |
| 2010/0281108 A1 | 11/2010 | Cohen | |
| 2010/0306805 A1 | 12/2010 | Neumeier et al. | |
| 2010/0319043 A1 | 12/2010 | Jain et al. | |
| 2011/0040760 A1 | 2/2011 | Fleischman et al. | |
| 2011/0041080 A1 | 2/2011 | Fleischman et al. | |
| 2011/0107369 A1 | 5/2011 | O'Brien et al. | |
| 2011/0158518 A1* | 6/2011 | Kang | G06K 9/4642 382/165 |
| 2011/0179385 A1 | 7/2011 | Li et al. | |
| 2011/0208722 A1* | 8/2011 | Hannuksela | G11B 27/034 707/723 |
| 2011/0246528 A1* | 10/2011 | Hsieh | H04L 67/42 707/791 |
| 2011/0264682 A1* | 10/2011 | Song | H04N 5/44513 707/769 |
| 2011/0317979 A1* | 12/2011 | Smith | H04N 21/47217 386/241 |
| 2012/0167132 A1 | 6/2012 | Mathews et al. | |
| 2012/0192227 A1 | 7/2012 | Fleischman et al. | |
| 2012/0215903 A1 | 8/2012 | Fleischman et al. | |
| 2013/0014136 A1 | 1/2013 | Bhatia et al. | |
| 2013/0019262 A1 | 1/2013 | Bhatia et al. | |
| 2013/0073480 A1 | 3/2013 | Sastri et al. | |
| 2013/0086489 A1 | 4/2013 | Fleischman et al. | |
| 2013/0125159 A1 | 5/2013 | Elizarov et al. | |

OTHER PUBLICATIONS

International Search Report and Written Opinion received for PCT Patent Application No. PCT/US2011/025757, dated Apr. 19, 2011, 13 pages.
International Search Report and Written Opinion received for PCT Patent Application No. PCT/US2012/046730, dated Sep. 21, 2012, 15 pages.
European Extended Search Report received for EP Patent Application No. 10800647.9, dated Dec. 21, 2012, 7 pages.
European Examination Report received for European Application No. 10800647.9, dated Oct. 7, 2013, 4 pages.
European Summons to Attend Oral Proceedings Pursuant to Rule 115(1) EPC received for EP Patent Application No. 10800647.9, dated Mar. 20, 2015, 6 pages.
Mexican Office Action received for Mexican Application No. 12/000724, dated Jun. 26, 2013, 7 pages. (3 pages English Translation + 4 pages Office Action).
Wattamwar et al., "Multimedia Explorer: Content Based Multimedia Exploration", Tencon 2008, IEEE Region 10 Conference, Nov. 19, 2008, pp. 1-6.
Japanese First Office Action received for Japanese Application No. 2012-520828, dated Feb. 18, 2014, 8 pages. (4 pages English Translation + 4 pages Office Action).
Japanese Second Office Action received for Japanese Application No. 2012-520828, dated Dec. 2, 2014, 7 pages. (4 pages of English translation + 3 pages Office Action).
Ah-Pine et al., "Crossing Textual and Visual Content in Different Application Scenarios", Multimedia Tools and Applications, vol. 42, No. 1, Kluwer Academic Publishers, Nov. 13, 2008, pp. 31-56.
Bouthemy et al., "A Unified Approach to Shot Change Detection and Camera Motion Characterization", IEEE Trans. on Circuits and Systems for Video Technology, vol. 9, No. 7, Oct. 1999, pp. 1-21.
Coden et al., "Multi-Search of Video Segments Indexed by Time-Aligned Annotations of Video Content", IBM Research Report, RC21444(96156), Nov. 18, 1998, pp. 1-12.
Decamp et al., "A Human-Machine Collaborative Approach to Tracking Human Movement in Multi-Camera Video," Proceedings of the International Conference on Content-based Image and Video Retrieval (CIVR), 2009, 8 pages.
Decamp et al., "An Immersive System for Browsing and Visualizing Surveillance Video", Proceedings of ACM Multimedia, 2010, 10 pages.
Fleischman et al., "Grounded Language Modeling for Automatic Speech Recognition of Sports Video", Proceedings of the 46th Annual Meeting of the Association for Computational Linguistics, Jun. 15-20, 2008, pp. 121-129.
Fleischman et al., "Mining Temporal Patterns of Movement for Video Content Classification", Proceedings of the 8th ACM Inter-

(56) References Cited

OTHER PUBLICATIONS national Workshop on Multimedia Information Retrieval, Oct. 2006, pp. 183-192.
Fleischman et al., "Situated Models of Meaning for Sports Video Retrieval," Proceedings of Human Language Technology Conference of the North American Chapter of the Association of Computational Linguistics, Apr. 22-27, 2007, 4 pages.
Fleischman et al., "Temporal Feature Induction for Sports Highlight Classification", Proceedings of the 15th International Conference on Multimedia 2007, Sep. 24-29, 2007, pp. 333-336.
Fleischman et al., "Unsupervised Content-Based Indexing of Sports Video Retrieval", Proceedings of the 9th ACM Workshop on Multimedia Information Retrieval (MIR), Sep. 2007, 9 pages.
Hauptmann et al., "Story Segmentation and Detection of Commercials in Broadcast News Video,", ADL-98 Advances in Digital Libraries Conference, Santa Barbara, CA, Apr. 22-24, 1998, 12 pages.
Jacobs et al., "Automatic Shot Boundary Detection Combining Color, Edge, and Motion Features of Adjacent Frames", Center for Computing Technologies, Bremen, Germany, 2004, 10 pages.
Kim et al., "Extracting Opinions, Opinion Holders, and Topics Expressed in Online News Media Text", Proceedings of the Workshop on Sentiment and Subjectivity in Text, Jul. 2006., pp. 1-8.
Kubat et al., "TotalRecall: Visualization and Semi-Automatic Annotation of Very Large Audio-Visual Corpora", Proceedings of the 9th International Conference on Multimodal Interfaces, 2007, 8 pages.
Levy et al., "Music Information Retrieval Using Social Tags and Audio", IEEE Transactions on Multimedia, vol. 11, No. 3., Apr. 2009, pp. 383-395.
Martinez, J. M., "MPEG-7 Overview (version 10)", International Organisation for Standardisation, ISO/IEC JTC1/SC29/WG11, Coding of Moving Pictures and Audio, Oct. 31, 2004, 80 pages.
Pang et al., "Opinion Mining and Sentiment Analysis", Foundations and Trends in Information Retrieval, vol. 2, No. 1-2, 2008, pp. 1-135.
Peacock, James D., "Radio Audience Estimates,", Peacock Research, Inc., available online at <:http://www.robertoigarza.files.wordpress.com/2008/11/art-radio-audience-estimates-peacock-20051.pdf>, Jan. 2005, 45 pages.
Tardini et al., "Shot Detection and Motion Analysis for Automatic MPEG-7 Annotation of Sports Videos", 13th International Conference on Image Analysis and Processing, Nov. 2005, 8 pages.

* cited by examiner

METHOD AND SYSTEM FOR GENERATING HIGHLIGHTS FROM SCORED DATA STREAMS

CROSS-REFERENCE TO RELATED APPLICATIONS

This application claims priority to U.S. Provisional Application Ser. No. 61/436,292, entitled "Real-Time Generation of Audio and/or Video Highlights From Scored Data Stream" and filed on Jan. 26, 2011. Priority to this prior application is expressly claimed, and the disclosure is hereby incorporated by reference in their entirety.

FIELD

The field of the invention relates generally to content sharing over a network, and more particularly to a method and system generating highlights from scored data streams.

BACKGROUND

Television and other broadcast-consumed multimedia viewers wish to view a condensed version of the content containing top moments, or "highlights." Highlights are particularly desirable for navigating sports programming or other live event broadcasting. Network news uses highlights to discuss media previously aired, and sportscasters use highlights for game summaries. Other applications use highlights when special topics are discussed or a longer form media is not desirable. Typically, highlights are produced by human editors who are knowledgeable in the media category and can determine the most important moments of interests from a media content. Human editors are responsible for selecting, assembling, and producing a slice of audio/video clips, and produce a list of short forms of clipped audio/video for viewing, sharing, or discussion.

Media content is manually edited and clipped using a computerized editing setup. For the case of digital media content, Digital Video Recorder (DVR)-like video/audio editing setup is used where the media is visualized in a video buffer and the editor selects and assembles highlights from the full-length media content. Manual editing and clipping requires human judgment and intervention to produce the desired highlights.

SUMMARY

A method and system for generating highlights from scored data streams is disclosed. According to one embodiment, media content containing time-stamped payloads is received in a data stream from one or more sources. The received media content is recorded in a buffer for a predetermined period of time and sliced into data buckets. For each of the data buckets, a score is assigned according to user-provided keywords. The data buckets are recorded along with the assigned score to determine highlights from the one or more sources using the scores of the recorded data buckets.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
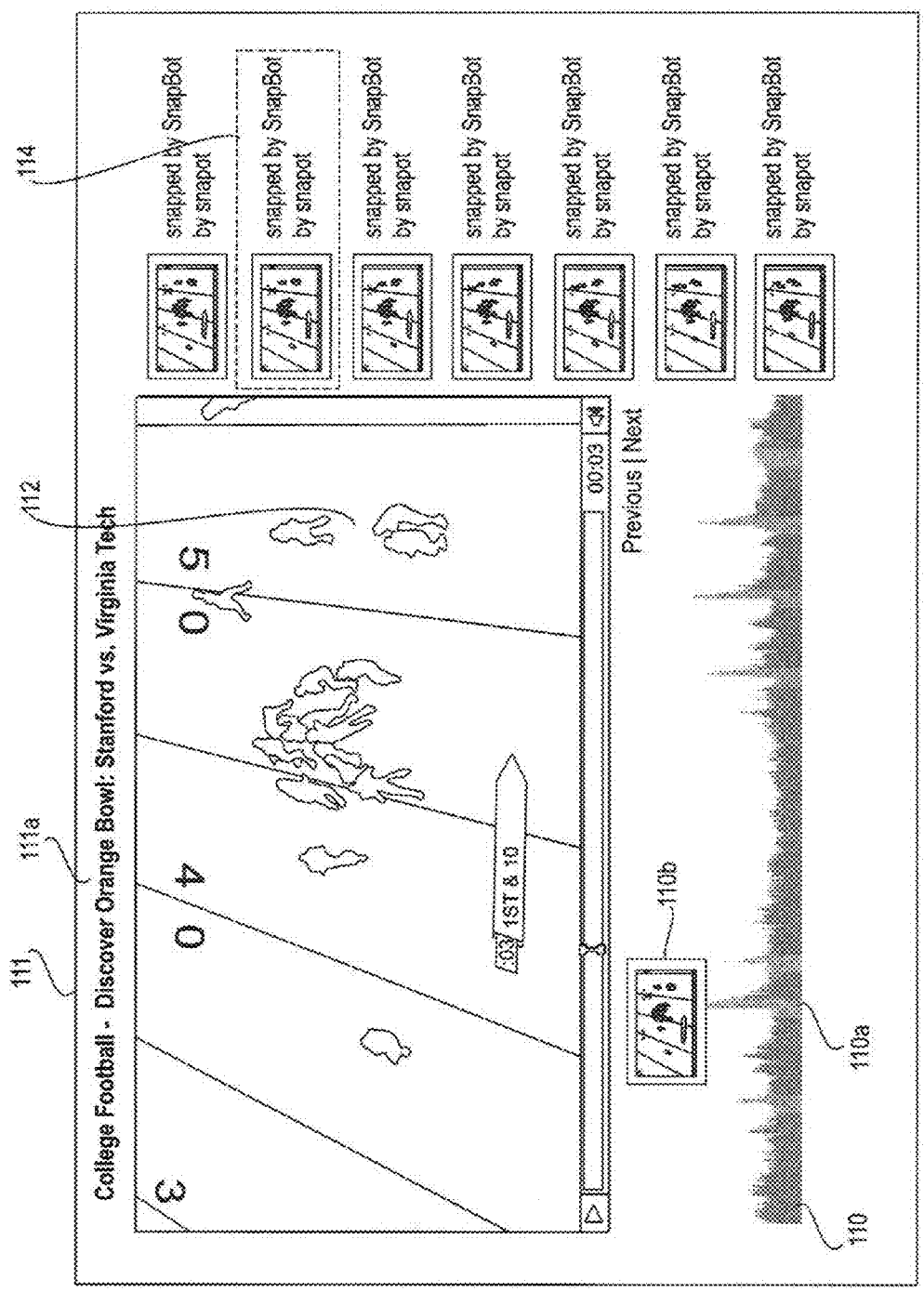
FIG. 1 illustrates a schematic view of an exemplary top moment viewer, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for generating highlights from scored data streams is disclosed. According to one embodiment, media content containing time-stamped payloads is received in a data stream from one or more sources. The received media content is recorded in a buffer for a predetermined period of time and sliced into data buckets. For each of the data buckets, a score is assigned according to user-provided keywords. The data buckets are recorded along with the assigned score to determine highlights from the one or more sources using the scores of the recorded data buckets.

Each of the features and teachings disclosed herein can be utilized separately or in conjunction with other features and teachings to provide a method and system for live media selection and sharing. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present system and method evaluates data streams from multiple input sources over time. According to one embodiment, two different data streams are received including a data stream (e.g., twitter term counts), and a content stream including media content (e.g., sports event, live broadcast). It is understood that any time-stamped streams can be used. The data stream is used to generate highlights from content stream. Content stream does not necessarily have any payload or bucket, and is getting sliced to produce a highlight using the data from the data stream. According to another embodiment, a single data stream is received, and the data stream contains both payload data and content, where the content is sliced based on the corresponding payload data.

Each data point has source data, for example, counts of twitter messages containing a specific keyword or term. Each data point is operated to obtain a single-valued score. During the scoring operation, specific keywords and terms are counted and multiplied by a user-defined weight. Once the data points in a stream are recorded and scored, an algorithm (e.g., breaking a threshold of a moving average) is applied to generate highlights by selectively slicing and clipping a portion of the scored data points with reference to high scored moments that broke the threshold. Typically, data streams containing both video and audio are sliced from a starting time that is before the target highlight moment that broke the threshold. The starting time is either predetermined or determined based on the subsequent data points. Similarly, the ending time for a highlight is either predetermined (e.g., for a fixed duration) or determined based on the data points. The sliced video clips are stored in a video buffer based on a time function from that data point.

The present system and method provides highlights (or "top moments") from data streams. Human intervention is not required during or after the media airing or playing but is limited for the system setup and configuration prior to media, airing and the parameterization of system parameters after or during the media airing. The present system and method inspects data streams real-time to infer highlights based on scores without relying on manual intervention and knowledge by a human editor. Clips of highlights are produced automatically with reference to the timing of the real-time data stream.

Figure 2:
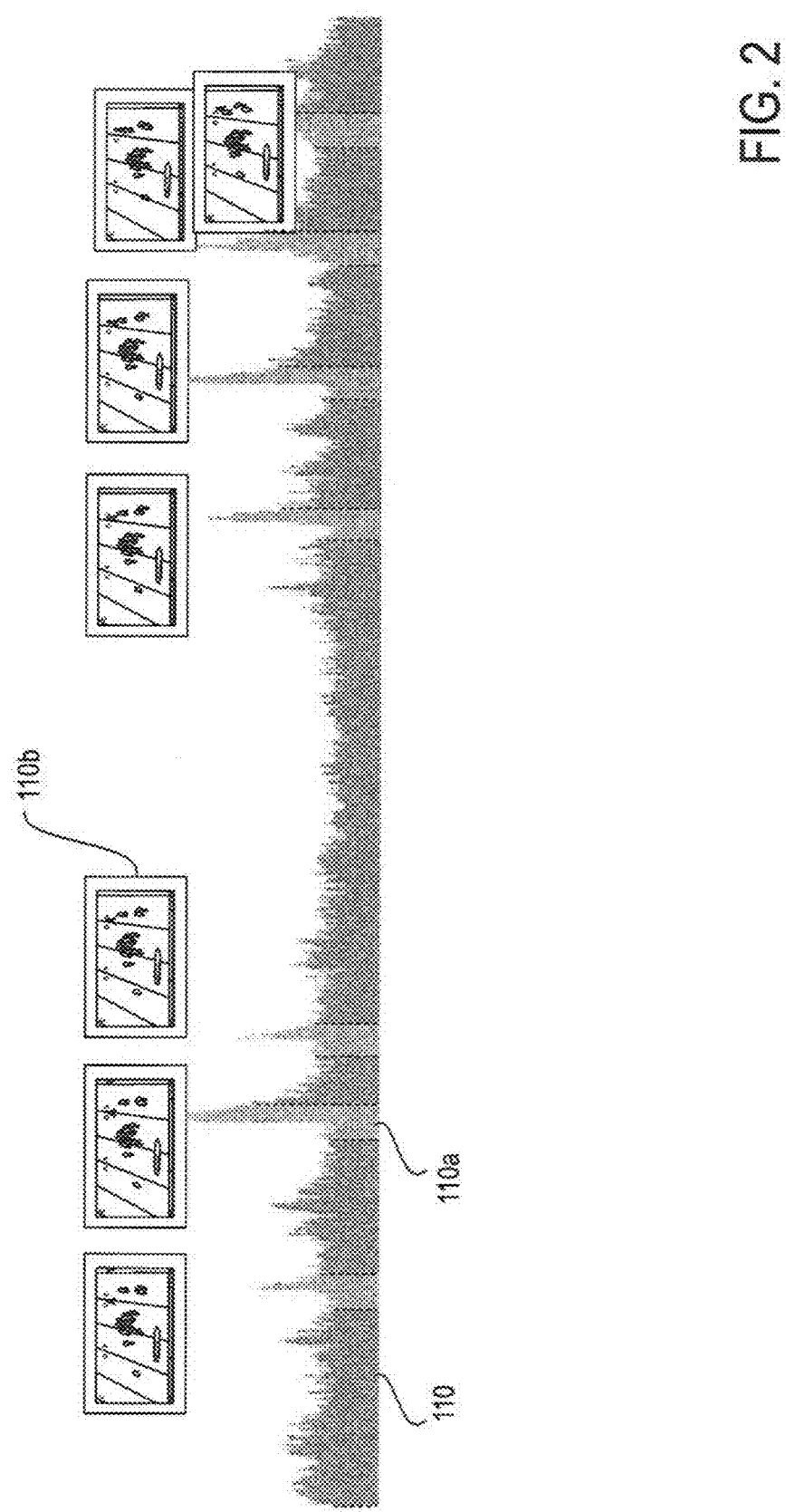
FIG. 2 illustrates a detailed schematic view of exemplary top moment visualizer, according to one embodiment.

According to one embodiment, the present system and method allows for real-time or near real-time automatic production of highlights from by real-time data streams. The present system is configured with an interval to produce a set of high-scored clips from the audio/video source. The interval is user-configured and determines the sampling rate for each bucket of data, where a bucket of data is a single value calculated by processing the data in the data stream during the interval. With reference to FIGS. 1 and 2, the interval is represented by a single data point on histogram 110*a*. For example, the interval of 10 seconds is used to plot the histogram. The values of data points are stored in a buffer for a user-configurable time period.

Clips are produced by applying an algorithm to the data points for each data bucket. For example, data points that exceed a threshold are selected, and the video segments that correspond to the selected data points are sliced for further processing. This set of clips contains highlights or top moments. Since these clips are automatically produced, they are immediately available for consumption in a short form using any techniques, such as simply playing them back in sequence or included in a commentary.

According to one embodiment, the present system and method generates highlights across many popular television stations, providing a "TV highlights from the last two hours." The present system and method may also be used to generate audio highlights across radio stations.

According to another embodiment, the present system and method is used to generate "crowd determined" highlights shown on a jumbo screen during a sports event. In one example, audio level signals from the crowd (e.g., sports events) are used as the data source. The audio level signals are summed at a 10 second interval, and the algorithm of a moving average threshold is applied to the summed audio level signals. For each data point that broke the threshold, the corresponding video signal (from a particular camera angle, or from multiple cameras) is clipped starting 5 seconds before the break for 20 seconds. These clips are played on a JumboTron so that the crowd response and behavior affect the playback on the JumboTron. These clips may be passed through a human to filter out when the camera did not catch the crowed cheering.

In another example, an in-stadium mobile application is provided to stadium-goers. The mobile application has a "clap" button and encourage stadium-goers to hit it when excited about something, or the mobile application uses motion sensing so stadium-goers' motion is detected when the person shakes the phone. The present system collects these data streams over time and uses them as the input data stream. The highlights could also be automatically sent to other destinations such as to a JumboTron, or to a specific "live highlights" web site.

According to yet another embodiment, the present system and method displays a real-time "popularity histogram"

during a live audio/video broadcast or a stream that is included in a live broadcast. The popularity histogram is generated in various ways, for example, by collecting twitter term counts real-time or crowd responses as discussed above. The popularity histogram may be sent back to viewers in a variety of ways. In one example, a popularity histogram captured from a computer output is spliced into the broadcast. In another example, a video signal that renders a histogram and/or other relevant parts (e.g., preview images of 110b) is captured with an alpha transparency color (e.g., green-screen) as background and mixed into the broadcast using a broadcast editor for display at the bottom of the viewer's screen while the broadcast continues, or in a rectangular section in one of the upper corners. This way, the participants of the broadcast can reference it verbally and even speculate from the popularity data. For example, 'social volume' from a live program discussing controversial issues such as presidential campaign, health care reform can be shared among the participants and viewers in the form of a popularity diagram.

In another example, popularity histogram is generated from reactions by actors or participants in a live media airing. Actors or participants make reference to a previous point in a show and replay the previous point (e.g., in picture-in-picture) to analyze the audience reactions. In yet another example, the producer of a show opens a twitter event and receives replies from twitter members. The replies that took place during the point in time being referenced with a particularly insightful or inflammatory comment are included into a popularity histogram as a social "deep dive" representing the audience's reaction.

According to yet another embodiment, the present system and method is used to automatically notify news agencies of media or live media airings that are significant or newsworthy and provide those agencies with the relevant media. The present system and method determines top moments from video or audio broadcast on the Internet such as a conference or key note speech. The present system and method also provides a way of comparing the popularity of highlight moments in or across TV shows, either side-by-side in real-time for those aired simultaneously, visually compared with no simultaneous airing necessary, or via mathematical subtraction or other techniques to create a different histogram. This way, an aggregate of highlights is produced from a plurality of media airings, providing a highlight of the season or other collection.

A variety of products and devices could be created for single purposes as described in the present application. Those skilled in the art would understand that any subset of described products or interfaces can purpose into a product or device. Other useful items that could be produced by the present system and method could be a continuous stream of highlights based on most recent highest-degree moment across all available media airings within a broader system that includes many instances for many media channels and sources.

The present system possesses one or more of the following functionalities and performs in concert one or more of these functionalities based on the user settings or user-provided predetermined conditions or rules.

1. Video Capture and Encoder

A user views a media that is being broadcast or previously downloaded. Video capture/encoder 101 captures and encodes the target media containing an audio/video signal while the media is being aired or played.

2. Video Buffer

While being captured and encoded by video capture/encoder 101, the media is buffered into video buffer 102 with date/time stamp parameters. The date/time parameters may contain a time offset to account for the capture and encoding time or delay in the signal source. The encoding process inserts a delay, usually in a predictable manner (e.g., 5 seconds). Depending on the broadcast method, a different value of a delay is applied. For example, a DirecTV signal or other satellite broadcast signals introduce a few seconds of a delay in comparison to a cable network broadcasting. In some cases, satellite signals are ahead of those of cable network broadcasting. Determination and application of a proper delay corrects the timing differences between what the end consumers see including tweets or other social actions as well as the video source used for video clipping/slicing.

The present system and method is concerned with the time the consumers sees the video as the time is a critical elements to infer the consumer's reaction, and it is important to synchronize the time of broadcasting and consumer's reaction thereto. The present system and method may ingest different sources in different codecs, for example, multiple video cameras with different angles, satellite broadcasting, stored video source from a disk drive, and signals from other video servers. The sources may contain a video stream with an unknown timing. To synchronize such a video stream, a user may manually watch the ingested video stream and compare it to a broadcast stream, for example, by sitting in front of the TV and tweaking the offset value until the frames seen in the ingested stream align with the broadcast. However, since the broadcast is often ahead of the ingest stream, the user must see an image on the TV then watch a clock to measure the offset value between when image came on the TV broadcast and when it was see in the ingest stream. According to one embodiment, the present system and method provides an automatic way to calculate the offset value by taking a snapshot of the TV broadcast with a timestamp at the moment of creation and detect the frame in the ingest stream using an image matching technique. According to another embodiment, an audio signature is used to synchronize the record TV audio with a time-stamp, and match the audio signature generated off the ingest stream to determine the offset value.

3. Video Slicer

A portion of the media is retrieved from video buffer 102 with an in-point and an out-point time stamp. In one embodiment, video slicer 103 clips the broadcast media corresponding to the in-point and the out-point as configured by the user and returns an encoded media clip. In another embodiment, video slicer 103 returns an encoded media clip using the stream location and user-defined parameter(s) by seeking the media and specifying an in-point and out-point time stamp identified by the stream location and user-defined parameter(s). The user-defined in-point time stamp may be computed by an algorithm applied to the data stream, for example, the moving average example discussed above. The out-point time stamp may be determined by the next time of relative inactivity, for example, the next time the moving average stays within the threshold for 3 consecutive 10 second data points, or the time of the next move average threshold breaks in the negative direction plus a user-configurable number of seconds. In another example, the out-point may simply be determined by a defined duration added to the in-point time stamp, for example, 1 minute.

4. Data Acquirer

Payload is a user-generated text or activity from a real-time data stream such as user's comments, status, or "likes"

from Twitter, Facebook, or any other social publishing content. According to one embodiment, data acquirer 104 reads payloads from a real-time data stream. Data acquirer 104 inspects data streams with a specific filter to retrieve only payloads that are relevant to the media. For example, data acquirer 104 filters the data streams with the user-specified keywords from available metadata contained in the media being aired or played. The data in the data stream contains a timestamp, a user text message, and/or a structured data bit such as a "like." The user may add these data while watching a media. These data may not be contained in a broadcast media, but may be contained in another data source(s) that are available simultaneously with the broadcast media. Data acquirer 104 ingests these data streams from one or more sources.

For example, twitter data is ingested to acquire data. In another example, a data stream that contains sports statistics or scores is used. In the latter case, the statistical data and/or scores are used to generate highlights. The payload received from twitter data is analyzed to assign scores. Depending on the time, relevancy, and other parameters, a particular keyword may be given a higher score than others. For example, the keyword 'touchdown' in a football game gets a 5, while '49ers' only gets a 1. Different scores may be given depending on who posted the data. For example, a posting from a twitter account (e.g., @ABCNews) containing specific keywords during a debate is given a score with a multiplier of 3 while postings from ordinary account holders are given a score with a unity multiplier. In other cases, specific terms such as 'breaking news" from ABCNews twitter account are given a high score to generate a highlight any time one comes in. Or a specific user (e.g., President Obama) is given a higher multiplier any time the user tweets.

According to one embodiment, data streams are configured to segment payloads using various filters and visualize the segmented payloads in various ways. For examples, a "tag cloud" of twitter terms produces a histogram for any particular term in the set, or a sum of any subset. In another example, if a user has both twitter data and Facebook 'like' data, the 'like' data is layered on the histogram in a separate color stacked on top of the twitter data.

According to one embodiment, various offsets are applied to the clipped media based on the payload, type of data stream, and/or the predetermined time delay in the stream. In the case of a payload in the form of a twitter text, the offset is calculated by the twitter text length multiplied by a static factor to account for the user typing speed. For example, a user took 40 seconds to type a twitter text using a mobile phone, "The 9ers really took it on the chin on this one. They aren't coming back next year. #49ersFail." The 18 words in 40 seconds correspond to 2.2 seconds per word. For this user, the static factor is calibrated to be 2.2 seconds/word. If the user types another message with two words, "#Touchdown 9ers!", then the offset of 4.4 seconds is applied. The first and second messages would be offset by (−)40 seconds and (−)4.4 seconds respectively to account for the user's typing time and the timestamp is placed at the point when the user tweets.

In another example, a source offset is applied to account for the delay in the twitter date and time stamping. Under a normal load, twitter message are processed, time-stamped and distributed within about 5 seconds. The load on the twitter server may vary as well as any other systems and/or servers that process and deliver twitter messages. The present system and method allows posting a twitter message at a recorded time by noting its timestamp once the message is delivered via its data stream. This delay between the recorded time for posting and delivery may be used to calibrate an additional offset to twitter data.

5. Data Bucketer

Data bucketer 105 receives the real-time date/time stamped payload and groups them by date and time into sets representing a configured interval. For example, the configured interval is 10 seconds. A single score value is assigned to data points of the configured interval of 10 seconds. Data acquirer 104 pulls the stream in and applies timestamp offsets using the techniques described above. Data bucketer 105 is on its own delay to make sure that it gets data that comes later but whose timestamp is adjusted with a negative offset. Data bucketer 105 then selects all the data since the end of the last bucket, and X number of seconds further. In one embodiment, depending on the desired granularity desired the interval is configured accordingly. If the twitter volume is low, a larger interval may be used.

6. Data Scorer

A score is generated for each data bucket produced by data bucketer 150. The score for a data bucket can be determined as simply as a count of payloads in the data bucket, or a sum of scores for the payloads. In one embodiment, each keyword is given a weight to calculate a score based on various factors, for example, relevance to the media, duration, counts of payloads, etc. Data scorer 106 determines the number of keywords in each payload, sums their weighted scores, calculates the total sum of the weighted payloads, and generates an overall bucket score. Those skilled in the art would recognize other variations for scoring data. In another embodiment, the real-time data source contains keywords entered by users into a web search interface. In this case, scoring is done by the total count of keywords, or weighted counts given by each keyword. In another case, data from a particular user account is given a multiplying value.

7. Date Recorder

Figure 5A:
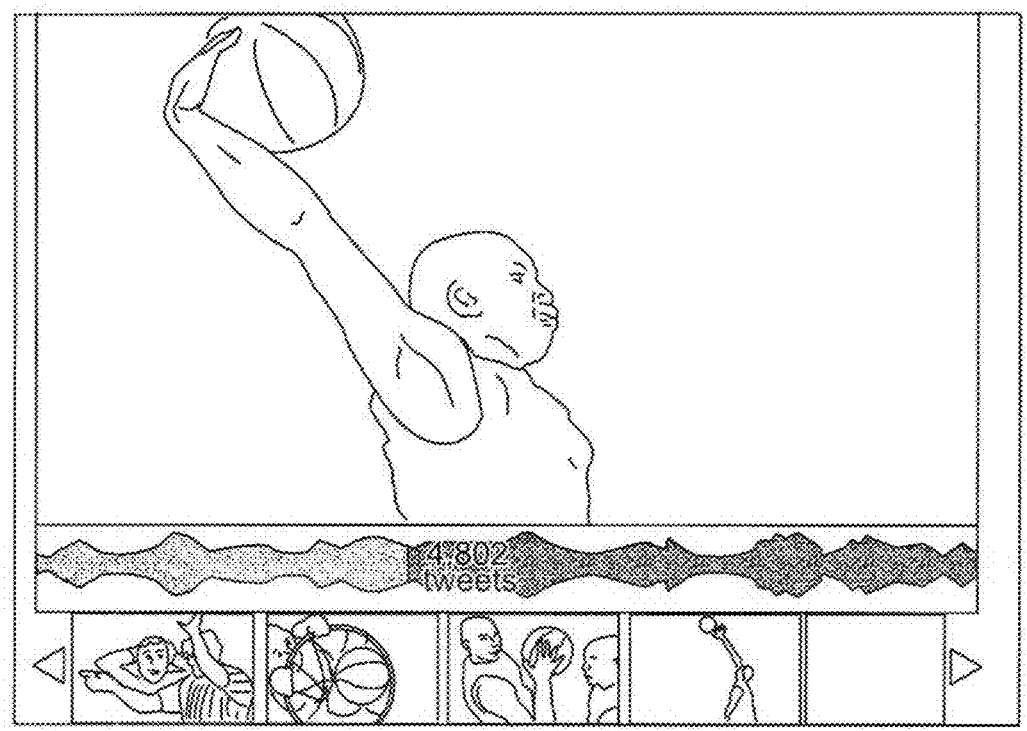
FIG. 5A illustrates an exemplary waveform projection representing highlights, according to one embodiment.
Figure 5B:
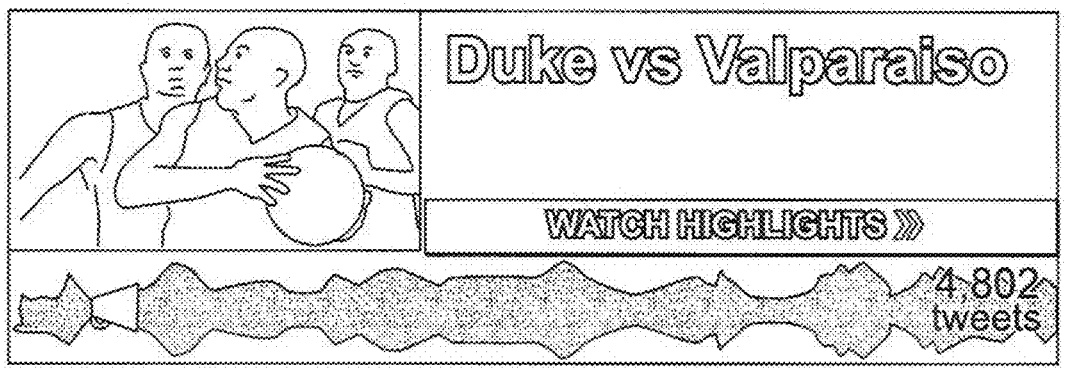
FIG. 5B illustrates another exemplary waveform projection representing highlights, according to one embodiment.

Data recorder 107 records each data bucket generated by data scorer 106 along with its score into a memory. Such recorded data is retrievable by date/time and can be visualized in a histogram or other form of chart. In one embodiment, a waveform projection representing highlights is employed. A waveform projection provides a smoothed histogram in the form of a waveform signal, i.e., mirrored around the X axis (e.g., time axis or tick marks). FIG. 5A illustrates an exemplary waveform projection representing highlights, according to one embodiment. The waveform projection is shown below the broadcast, and the thumbnail images or graphics are shown at the bottom of the user's screen. The user places a cursor on the waveform projection to display the payload data, in this example, the number of tweeter term counts. The user's placement of the cursor on the thumbnail images or graphics renders plays the corresponding highlights to be played. FIG. 5B illustrates another exemplary waveform projection representing highlights, according to one embodiment, in this case a basket ball game. The title of the basketball game is shown, and the user watches the highlights by clicking the "Watch Highlights" button on the user's screen. The projection is represented by the histogram smoothed using a smoothing algorithm (e.g., weighted average, applying an average of +1 and −1 data value for example), and the image mirrored around the X axis to show a "waveform-like" image.

8. Outlier Determiner

An outlier refers to an outlying observation that deviates markedly from other members of a sample in which it appears. Outlier determiner 108 determines and records date/times as well as a degree where a bucket score exhibits a statistical outlier. Those skilled in the art would appreciate variations on determining statistical outliers in a time-sequenced data and in valuing those outliers with a computed degree. For example, a trailing moving average is used. A moving average is the sum of the last X data points divided by X. The threshold is compared to the difference in the moving average between one data point and the next. The window time and sensitivity are configured, and the degree is determined by the percent difference to the moving average.

The average score of the previous X buckets is calculated and compared with the current bucket score. The degree is determined by the percent difference between the current bucket score and the moving average. Consider an example that has the following bucket scores:

2, 3, 3, 2, 12, 3, 2, 3, 2, 9.

The threshold is configured at 200%. In this example, the fifth bucket with the score of 12 has the 4-bucket trailing moving average of 2.5 (2+3+3+2)/4, and the degree is 380% ((12−2.5)/2.5)*100, which broke the 200% threshold. A clip is created to coincide with the point in time corresponding to the $5^{th}$ bucket. Similarly, the $10^{th}$ bucket with the score of 9 has a 4-bucket trailing moving average of 2.5 (3+2+3+2)/4 and the degree is 260% ((9−2.5)/2.5)*100. Consequently, a clip is created to coincide with the timing of the $10^{th}$ bucket as well.

The slope is calculated as the change in the moving average. Consider an example that has the following bucket scores in the form of data (moving average, slope with, slope without, degree):

3(2.5,0,0,0), 2(2.5,0,0,0), 5(3,0.5,0,0.5), 7(4.25,1.25,0.5, 0.75).

The X axis is considered to be tick marks (1, 2, 3, 4, 5, etc.), so the change in X (delta X) is 1 when calculating the slope of the moving average between each tick mark. Given a threshold of 0.4, the third and fourth data buckets represent points for which clips would be created.

9. Top Moment Producer

According to one embodiment, the present system is activated manually or automatically during the media airing or playing, at the end of the media airing or playing, or even across media airing or playing with normalized scoring in outlier determiner 108. Top moment producer 109 produces a configured or parameterized number of "top moments" from the date/time range given or a set based on a configured or parameterized outlier degree threshold. As an input, top moment producer 109 takes a reference to the media airing, date/time range, parameters specifying requested count of top moments or degree threshold, and produces as a result a set of highlights using the video slicer 103. To determine the highlights, top moment producer 109 reads outlier buckets from outlier determiner 108 over the specified range. When creating a set number of clips, the buckets are sorted by degree and the highest set is taken. When using a threshold, all buckets over the threshold are included. Those skilled the art would understand that there are other variations of request and response parameters given date/time stamped outlier buckets. Once the bucket results set is generated, each bucket date/time is used to generate a clip by making a request to data acquirer 104 with the bucket's date/time. In addition, outlier determiner 108 may apply statistical analysis to the data within a highlight to determine which relevant key words or data entries to display, if any.

10. Top Moment Visualizer

According to one embodiment, the present system contains an optional top moment visualizer 110. Top moment visualizer 110 produces a visualization of data obtained by data recorder 107, outlier determiner 108, and top moment producer 109. In a preferred embodiment, the visualization takes the form of a histogram, with bucket time along the X axis and bucket score along the Y axis, and sections colored differently to indicate top moments from top moment producer 109. During the media airing, buckets are added to the user interface as the data become available.

11. Top Moment Viewer

According to one embodiment, the present system contains an optional top moment viewer 111. Top moment viewer 111 provides a user interface to play top moments produced by top moment producer 110, in combination with interactions with the visualization from top moment visualizer 110.

FIG. 1 illustrates a schematic view of an exemplary top moment viewer, according to one embodiment. Top moment viewer 111 shows title 111a and contains media player 112. Media player 112 show the media broadcast or content from a data stream. On the right of top moment viewer 111, list 114 of top moments of the current media being played by media player 112 is shown. Top moment visualizer 110 is shown at the bottom of top moment viewer 111. Top moments are highlighted in a different color in a histogram view 110a. The higher the score is, the higher the peak in the histogram view 110a. Top moments may also be shown in a thumbnail 110b when the cursor is located on top moment visualizer 110.

FIG. 2 illustrates a detailed schematic view of exemplary top moment visualizer, according to one embodiment. Histogram view 110a represents the score of data buckets within the specified interval. For each data bucket, a score is obtained by the user-specified keywords, parameters, and rules. When calculating the score represented by the height in histogram view 110a, those data that lie outside of the threshold are excluded by outlier determiner 108. Those skilled in the art would understand that data of this dimensionality can be visualized in other useful ways.

Figure 3:
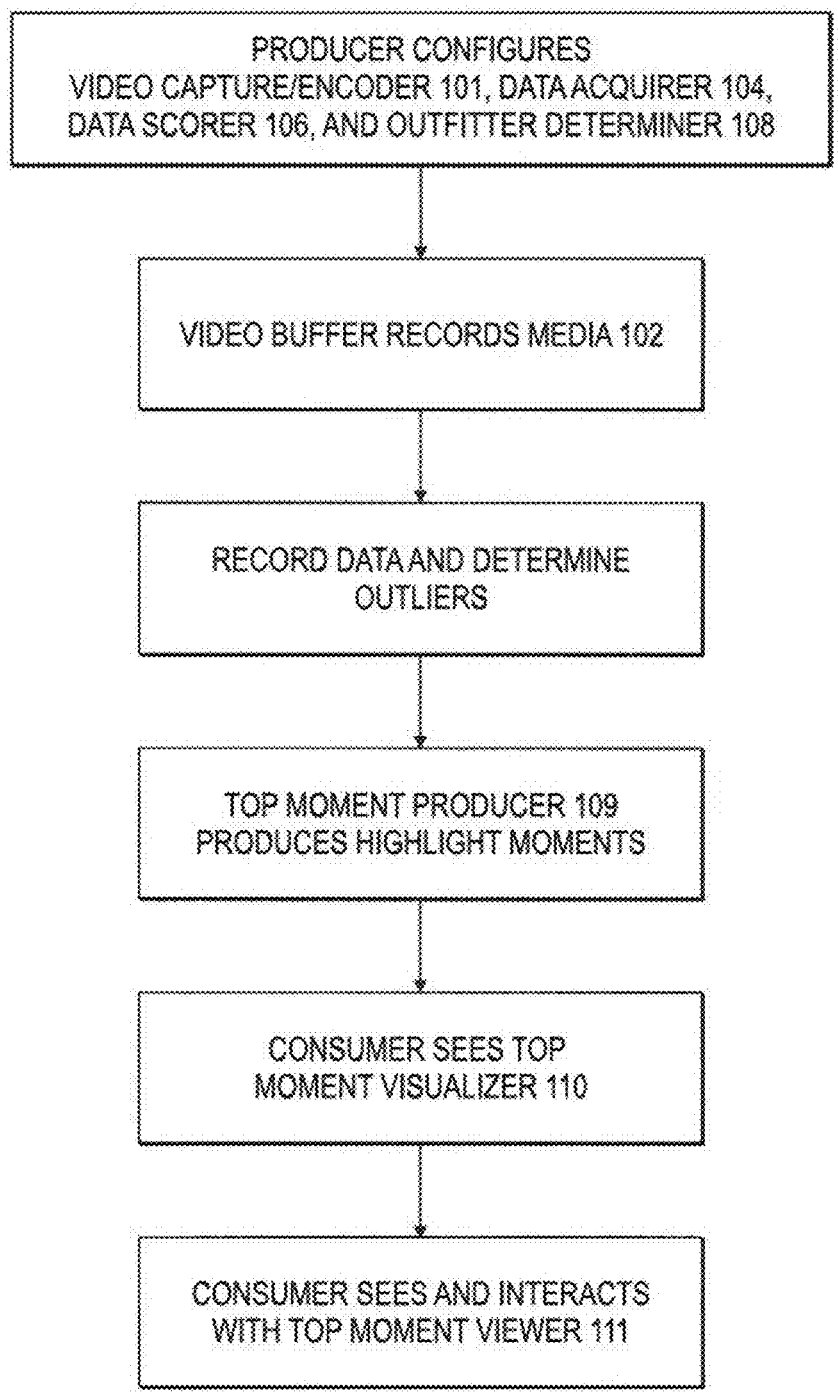
FIG. 3 illustrates an exemplary flow chart for producing highlights from a media, according to one embodiment.

FIG. 3 illustrates an exemplary flow chart for producing highlights from a media, according to one embodiment. Video capture/encoder 101, video buffer 102, and video slicer 103 work in concert to generate real-time clips from a live data stream. Data acquirer 104, data bucketer 105, data scorer 106, and data recorder 107 work in concert to collect and score data from real-time data stream, and produce outlier buckets. Top moment producer 109 uses outlier determiner 108 to gather outliers and video slicer 103 to produce the corresponding media. Top moment visualizer 110 shows data generated from data recorder 107 and outlier determiner 108. Top moment viewer 111 provides an interface into top moment visualizer 110 to play the media produced by top moment producer 109.

Producer is an individual designated by the media owner or party, or may be an end user (if enabled). Producer configures the overall system before, during and/or after the media airing or playing. Producer configures the media in various ways, for example, choosing the media source for video capture/encoder 101, selecting a data stream and parameters for that data stream for data acquirer 104, the interval for data bucketer 105, the scoring parameters for data scorer 106, parameters for outlier determiner 108, and intervals or manual on-demand actions for top moment producer 109.

Consumers view top moment visualizer 110 and interfaces with top moment viewer 111 to watch the highlights.

Partners may request data from top moment producer 109 and outlier determiner 108 to create a different interface of their own design.

A Referring to FIG. 3, a producer configures media capture/encoder 101, data acquirer 104, data scorer 106, and outlier determiner (301). The media is recorded in video buffer 102 (302). Outlier determiner 108 determines outliers from the recorded data (303). Top moment producer 109 produces highlight moments (304). Consumer sees the media via top moment visualizer 110 (305) and interacts with top moment viewer 111 (306).

Figure 4:
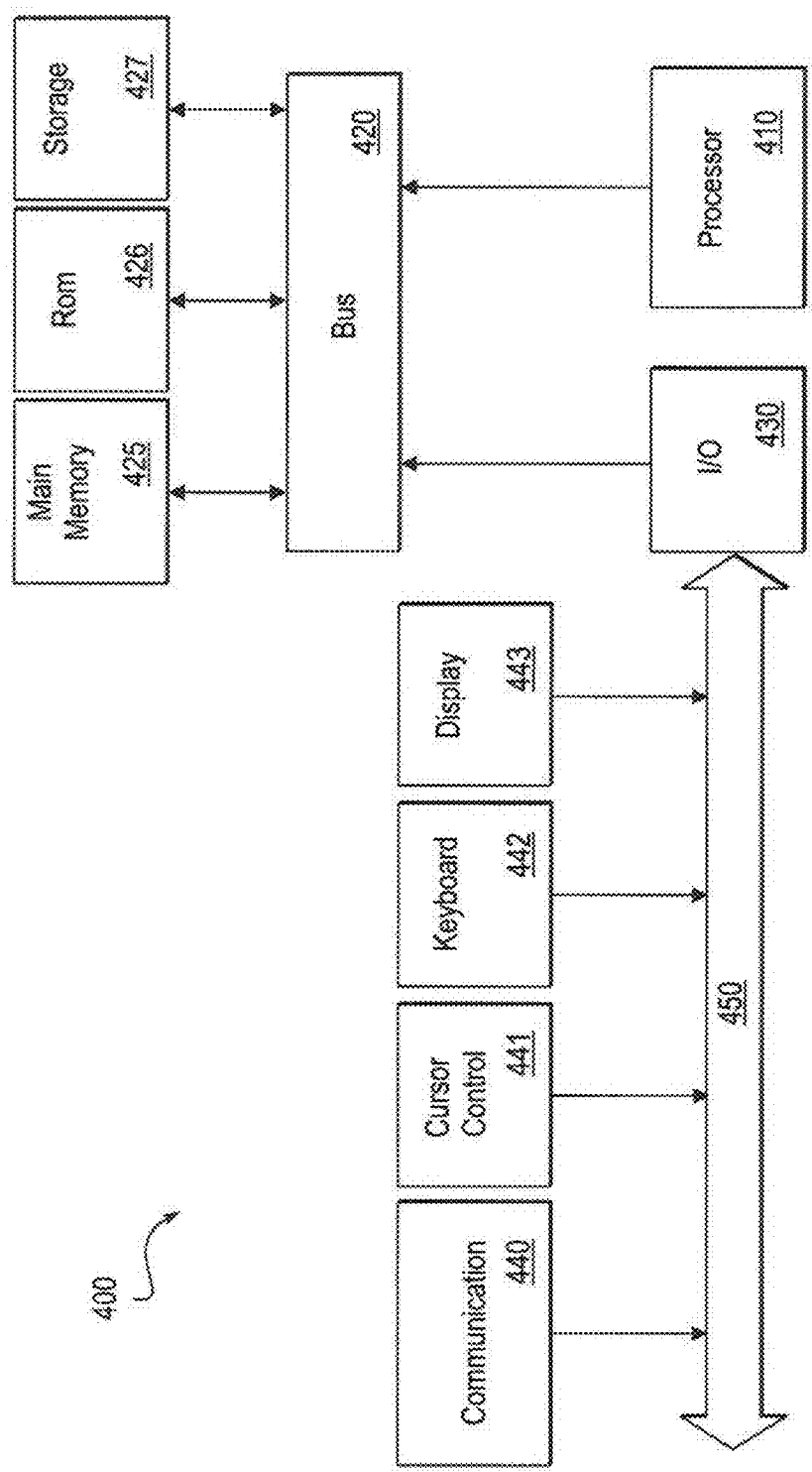
FIG. 4 illustrates an exemplary computer architecture for use with the present system, according to one embodiment.

FIG. 4 illustrates an exemplary computer architecture 400 for use with the present system, according to one embodiment. Computer architecture 400 may be used to implement an online referral system with all or a part of the components shown in FIGS. 1 and 2. One embodiment of architecture 400 comprises a system bus 420 for communicating information, and a processor 410 coupled to bus 420 for processing information. Architecture 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Architecture 400 also may include a read only memory (ROM) and/or other static storage device 426 coupled to bus 420 for storing static information and instructions used by processor 410.

A data storage device 427 such as a flash memory, a magnetic disk or optical disc and its corresponding drive may also be coupled to computer system 400 for storing information and instructions. Architecture 400 can also be coupled to a second I/O bus 450 via an I/O interface 430. A plurality of I/O devices may be coupled to I/O bus 450, including a display device 443, an input device (e.g., an alphanumeric input device 442 and/or a cursor control device 441).

The communication device 440 allows for access to other computers (servers or clients) via a network. The communication device 440 may comprise a modem, a network interface card, a wireless network interface or other well known interface device, such as those used for coupling to Ethernet, token ring, or other types of networks.

Although the preferred embodiments of the present invention have been illustrated and described in detail, it will be readily apparent to those skilled in the art that various modifications may be made therein without departing from the spirit of the present invention or from the scope of the appended claims.

We claim:

1. A method, comprising:
receiving live media content;
receiving, from a plurality of users of a social publishing content provider, a plurality of time-stamped payloads including responses to the media content;
analyzing payload content of the plurality of time-stamped payloads;
assigning the plurality of time-stamped payloads to media content based on the analyzing of the payload content and based on the time-stamping of the plurality of time-stamped payloads;
segmenting the media content into a plurality of segments based on an analysis of a plurality of scored data points with respect to a threshold, the plurality of scored data points corresponding in time with the media content based on time-stamping of the plurality of time-stamped payloads,
the segmenting including:
analyzing the plurality of scored data points using a moving window average, including assigning a numerical score for each of a plurality of data points in the moving window, the assigning of the numerical score for each of the plurality of data points including detecting a number of instances of a specified keyword from the plurality of time-stamped payloads for each data point in the moving window;
generating a highlight of the media content, the highlight including at least one segment of the plurality of segments;
determining a time offset value for each of the one or more media content sources by comparing streams from the one or more media content sources; and synchronizing the streams from the one or more media content sources based on the time offset value.

2. A non-transitory computer readable medium having stored thereon computer-readable instructions, which instructions when executed by a processor cause the processor to perform operations comprising: receiving live media content from one or more media content sources; receiving a plurality of time-stamped payloads including responses to the media content; analyzing payload content of the plurality of time-stamped payloads; assigning the plurality of time-stamped payloads to media content based on the analyzing of the payload content and based on the time-stamping of the plurality of time-stamped payloads; segmenting the media content into a plurality of segments based on an analysis of a plurality of scored data points with respect to a threshold, the plurality of scored data point corresponding in time with the media content based on time-stamping of the plurality of time-stamped payloads, the segmenting including: analyzing the plurality of scored data points using a moving window average, including assigning a numerical score for each of a plurality of data points in the moving window, the assigning of the numerical score for each of the plurality of data points including detecting a number of instances of a specified keyword from the plurality of time-stamped payloads for each data point in the moving window;
generating a highlight of the media content, the highlight including at least one segment of the plurality of segments;
determining a time offset value for each of the one or more media content sources by comparing streams from the one or more media content sources; and synchronizing the streams from the one or more media content sources based on the time offset value.

* * * * *